(12) United States Patent
Borkenhagen et al.

(10) Patent No.: US 8,010,215 B2
(45) Date of Patent: Aug. 30, 2011

(54) STRUCTURE FOR SELECTING PROCESSORS FOR JOB SCHEDULING USING MEASURED POWER CONSUMPTION

(75) Inventors: John M. Borkenhagen, Rochester, MN (US); Jay S. Bryant, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 12/056,834

(22) Filed: Mar. 27, 2008

(65) Prior Publication Data

US 2009/0249093 A1    Oct. 1, 2009

Related U.S. Application Data

(63) Continuation-in-part of application No. 11/662,581, filed on Jan. 12, 2007.

(51) Int. Cl.
*G06F 19/00* (2011.01)
(52) U.S. Cl. .......................................... 700/95; 716/109
(58) Field of Classification Search .................... 700/95, 700/102, 103, 106; 716/100, 106, 109, 111, 716/112, 136
See application file for complete search history.

(56) References Cited

U.S. PATENT DOCUMENTS

| | | | | |
|---|---|---|---|---|
| 6,898,580 | B1 * | 5/2005 | Curran et al. | 705/400 |
| 7,127,625 | B2 * | 10/2006 | Farkas et al. | 713/320 |
| 7,890,894 | B2 * | 2/2011 | Bjesse et al. | 716/132 |
| 2002/0188910 | A1 * | 12/2002 | Zizzo | 716/1 |
| 2004/0215987 | A1 | 10/2004 | Farkas et al. | |
| 2005/0055590 | A1 | 3/2005 | Farkas et al. | |
| 2005/0132239 | A1 | 6/2005 | Athas et al. | |
| 2005/0278520 | A1 * | 12/2005 | Hirai et al. | 713/1 |
| 2006/0095913 | A1 | 5/2006 | Bodas et al. | |

FOREIGN PATENT DOCUMENTS

| | | |
|---|---|---|
| EP | 1096360 A1 | 5/2001 |
| EP | 1182548 A | 5/2008 |

* cited by examiner

*Primary Examiner* — Ramesh B Patel
*Assistant Examiner* — Chad Rapp
(74) *Attorney, Agent, or Firm* — Bockhop & Associates, LLC

(57) ABSTRACT

In a design structure for allocating a plurality of parts of a computational system to a computational job, a set of requirements necessary to execute the job is determined. A set of parts of the plurality of parts is assembled so that the set of parts is capable of meeting the set of requirements and so that a part is added to the set of parts based on a determination that the addition of the part will minimize power consumption by the set of parts. The set of parts are caused to execute the job.

7 Claims, 3 Drawing Sheets

STRUCTURE FOR SELECTING PROCESSORS FOR JOB SCHEDULING USING MEASURED POWER CONSUMPTION

CROSS-REFERENCE TO RELATED APPLICATION(S)

This application is a continuation-in-part of, and claims the benefit of, U.S. patent application Ser. No. 11/622,581, filed Jan. 12, 2007, the entirety of which is hereby incorporated herein by reference.

BACKGROUND OF THE INVENTION

1. Field of the Invention

The present invention relates to a design structure, and more specifically to a design structure for allocating parts to a computational job based on power consumption by the parts.

2. Description of the Prior Art

Supercomputers and multiprocessor computers consume vast amounts of power. The utility bills for the electricity to run a large scale computational system and the air-conditioning to cool the system can be substantial. Power consumption in a large scale computational system can be a significant part of the total cost of ownership for a system.

To combat the problem of excess power usage, computer makers have used one technique that involves including only parts from a production line that run the most efficiently in a computer system. Another technique is to decrease the frequency and voltage of the chips while under low load conditions to save energy. Another technique is to disable chips that are not currently being used.

However, greater efficiency is still needed, as the costs due to power consumption by large scale systems is still quite large. The cost savings of incremental improvements in efficiency as small as 10% could result in a savings of thousands of dollars per year for a single system.

Therefore, there is a need for a system that reduces power consumption in a large scale computer system.

SUMMARY OF THE INVENTION

The disadvantages of the prior art are overcome by the present invention which, in one aspect, is a method of allocating a plurality of parts of a computational system to a computational job, in which a set of requirements necessary to execute the job is determined. A set of parts of the plurality of parts is assembled so that the set of parts is capable of meeting the set of requirements and so that a part is added to the set of parts based on a determination that the addition of the part will minimize power consumption by the set of parts. The set of parts are caused to execute the job.

In another aspect, the invention is a method of allocating a plurality of parts of a computational system to a computational job. A set of parts, each part associated with a part type, is ranked according to power consumption by the part. The part types that are required to execute the computational job is determined. A set of available parts of the types required to execute the computational job is allocated to the job. The parts are allocated so as to have the lowest power consumption for the type.

In yet another aspect, the invention is a system for allocating a plurality of parts of a computational system to a computational job. A parts information storage stores an indication of power consumption by each of the plurality of parts. A parts assembler allocates a set of the plurality of parts to the computational job based on an indication of power consumption by each part stored in the parts information storage.

In yet another aspect, the invention is a design structure embodied in a machine readable medium that includes a parts information storage that stores an indication of power consumption by each of the plurality of parts. A parts assembler allocates a set of the plurality of parts to the computational job based on an indication of power consumption by each part stored in the parts information storage.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
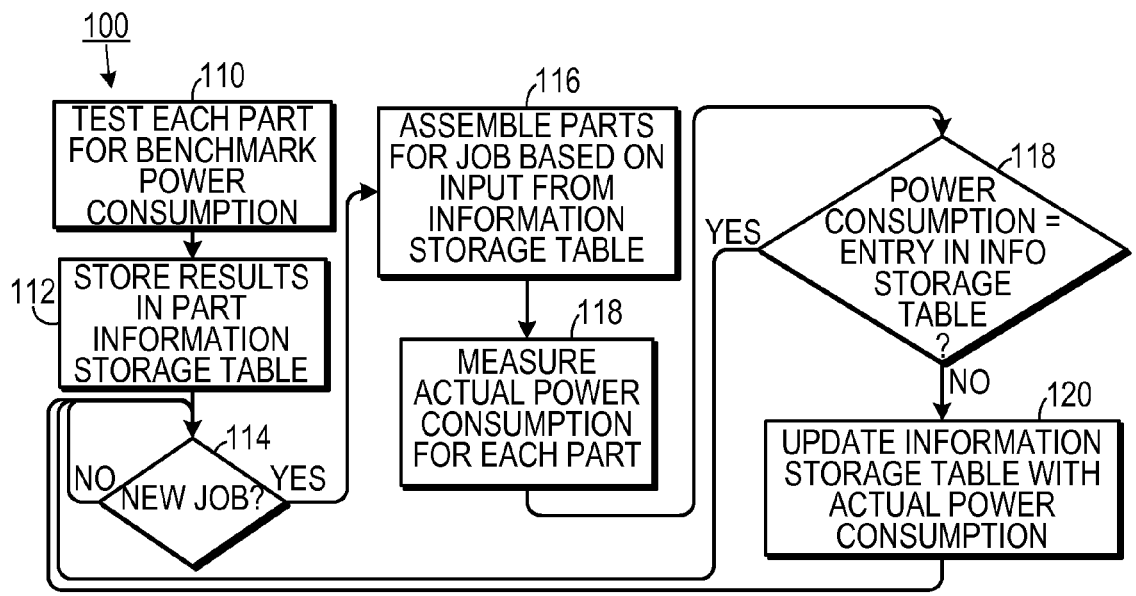
FIG. 1 is a flow chart the shows a method of reducing power consumption in a computational system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment is a method 100 of allocating a plurality of parts of a computational system to a computational job. The parts could include accessory cards, such as graphics cards, input/output cards and the like. The parts could also include processors used in multiprocessor systems. In one embodiment, the parts could include on-chip components. Initially, each part is tested 110 to determine a benchmark power consumption by the part. The benchmark testing could test the card under a single set of conditions, or the card could be tested under several sets of conditions (e.g., temperature, signal level, power supply level, clock speed, etc.). The results of the benchmark testing are stored in a part information storage table 112 or other data structure. Each part of each type may then be ranked according to its respective power consumption.

When a new job 114 is sent to the computational system, a parts assembler allocates to the job based at least on the requirements of the job and the power consumption data stored in the part information storage table 116. If operating condition data is also included in the part information storage table, then the current operating conditions of the computational system could also form part of the basis of parts allocation decisions. As between two available parts of equal functionality, the part with the lowest power consumption is assigned to the job.

The job is then executed and the actual power consumption of each part is measured 118 during execution of the job. The result is then compared to the stored information 118 regarding the power consumed by the part. If the stored power consumption information for a part does not correspond to the measured power consumption, then the part information storage table is updated with the actual measured power consumption for the part 120.

Each part may be tested and allocated according to various classifications of the job and the expected configuration. For example, the workload classification of the job and the condition classification of the job may be considered in the allocation process. Certain types of jobs may result in a greater workload (e.g., due to massively repetitive calculations) than others. Similarly, certain configurations of parts might result in a higher operating temperature, or other condition, than others. The allocation of parts could be made responsive to either or both of these classifications.

Figure 2:
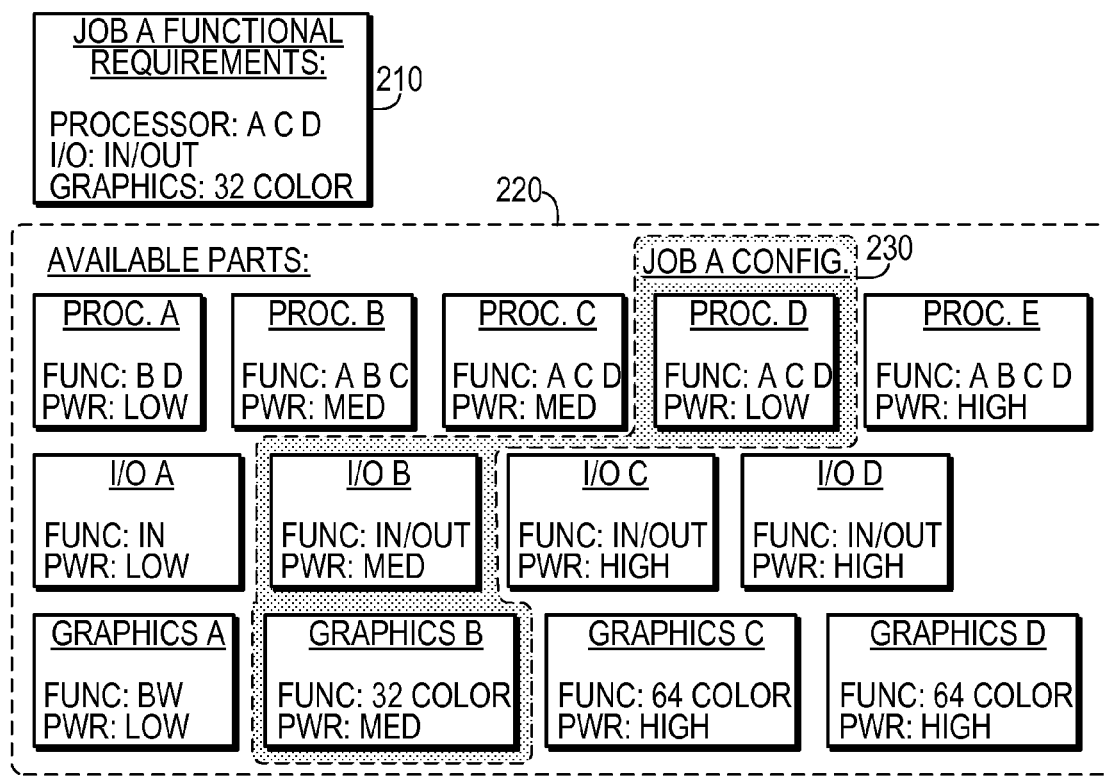
FIG. 2 is a block diagram that shows selection of computational elements according to one embodiment.

In one simplified example, as shown in FIG. 2, the functional requirements 210 for a job ("JOB A") include a processor that can execute functions "A," "C," and "D" (In designating functions in this example, the letters "A," "B," "C," "D," etc. are used only as labels for hypothetical functions and do not imply that a component is capable of executing any specific function.); an I/O card that can execute both input and output functions and a graphics card that can generate 32 bit data fields representing different colors.

In this example, the set of available parts include two processors that can execute the required functions: processors "C" and "D." However, processor "D" has a low power consumption rating, whereas processor "C" has a medium power consumption rating and, thus, processor "D" is allocated to the job. Similarly, the I/O card that can execute both input and output functions with the lowest power rating is "I/O B," which is also allocated to the job. The lowest power graphics card that is able to generate color data with 32 bits is "GRAPHICS B," which is also allocated to the job. Therefore, the configuration 230 for JOB A includes "PROC. D," "I/O B," and "GRAPHICS B."

Figure 3:
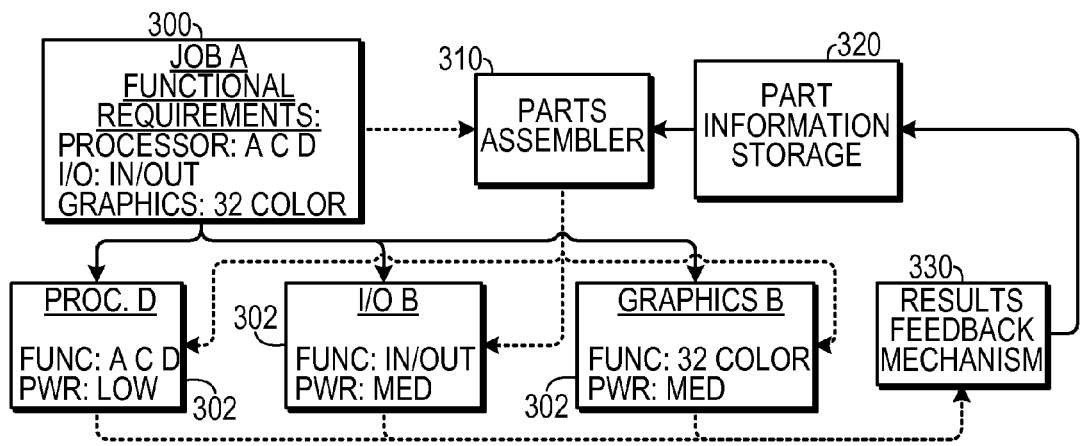
FIG. 3 is a block diagram that shows an assembly of parts in accordance with FIG. 2.
Figure 4:
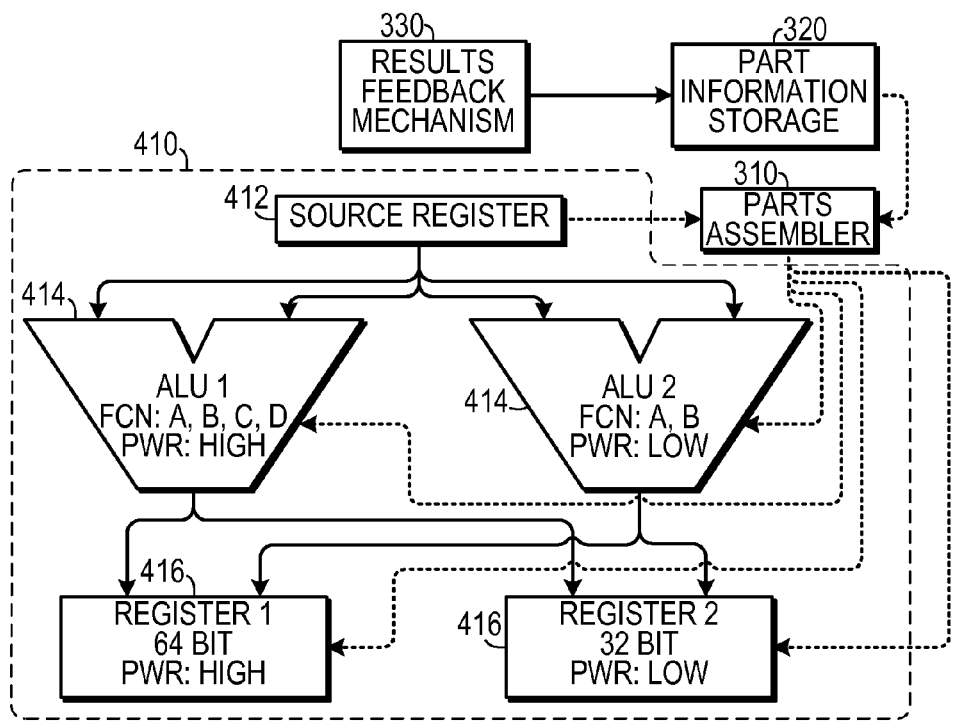
FIG. 4 is a block diagram that shows an on-chip embodiment.

The relationship between the job allocation elements and the allocated parts is shown in FIG. 3. The job scheduler 300 transmits the functional requirements for the job to the parts assembler 310. The parts assembler retrieves parts information from the part information storage 320 data structure and allocates the parts 302 to the job. As the job executes, actual power consumption data for each of the parts 302 is transmitted to the results feedback mechanism 330, which updates the parts information storage 320.

In an alternate embodiment, directed to on-chip 410 parts, the system could be applied to such on-chip parts as arithmetic-logic units (ALUs) 414 and registers 416. When a new job is received by a source register 412, the job requirements are sent to a parts assembler 310, which uses the mechanism of the type disclosed with reference to FIG. 3 above to allocate the parts used to execute the job.

This system provides a mechanism to schedule jobs in a large multiprocessor system using the most efficient hardware available. It does not rely on the manufacturer supplied properties of a component or on modifying a component to run differently. Instead, it works in concert with those solutions, applying them after appropriate hardware has been selected for inclusion in a system.

This system takes advantage of technology that can detect the amount of power being used by a component in a running system. It runs a benchmark test for every component in the system and measures the power used. The components in the system can then be ranked in order of efficiency. When a job is scheduled or a compute block is created, the more efficient components will be used in preference to less efficient components.

This embodiment of the system has four parts: benchmark testing, part information storage, a parts assembling, and providing a results feedback mechanism. The benchmark testing measures the power performance characteristics of each part (e.g., processor, memory card, IO Card) under a variety of conditions. Part information storage is a database, or other data structure, that contains power performance characters about all of the parts for all past test runs and, optionally, for performance of real world jobs. The parts assembler uses the information in the database to choose the parts used for a particular configuration (e.g., a job might require five processors, each operating at an 80% power supply voltage and a 75% maximum clock). The results feedback mechanism compares the predicted power performance to the actual power performance and records any changes in the part information storage component.

Figure 5:
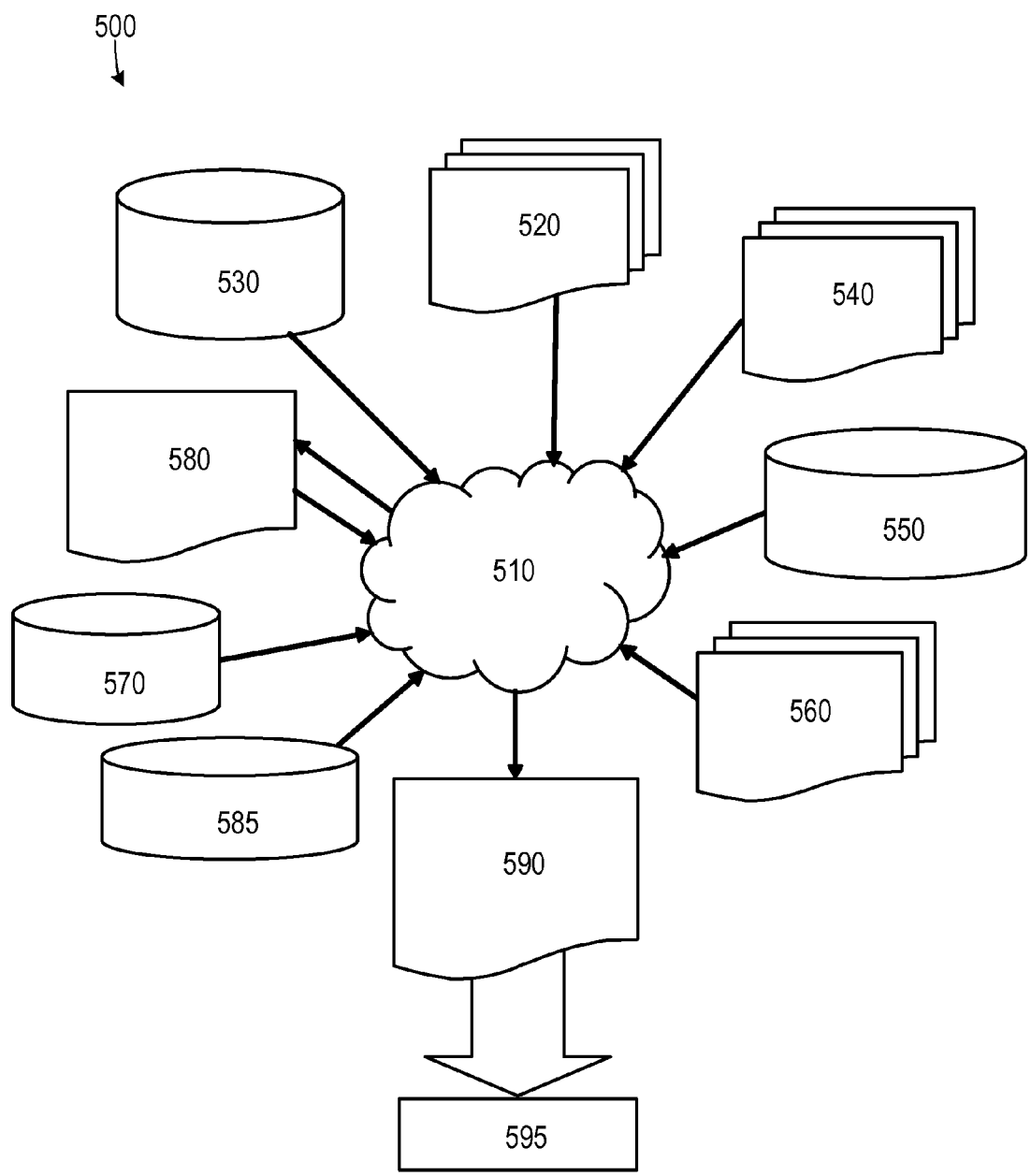
FIG. 5 is a flow diagram of a design process used in semiconductor design, manufacture, and/or test.

FIG. 5 shows a block diagram of an exemplary design flow 500 used for example, in semiconductor design, manufacturing, and/or test. Design flow 500 may vary depending on the type of IC being designed. For example, a design flow 500 for building an application specific IC (ASIC) may differ from a design flow 500 for designing a standard component. Design structure 520 is preferably an input to a design process 510 and may come from an IP provider, a core developer, or other design company or may be generated by the operator of the design flow, or from other sources. Design structure 520 comprises an embodiment of the invention as shown in [fill in figure or figures that represent the design] in the form of schematics or HDL, a hardware-description language (e.g., Verilog, VHDL, C, etc.). Design structure 520 may be contained on one or more machine readable medium. For example, design structure 520 may be a text file or a graphical representation of an embodiment of the invention as shown in [fill in figure or figures that represent the design]. Design process 510 preferably synthesizes (or translates) an embodiment of the invention as shown in [fill in figure or figures that represent the design] into a netlist 580, where netlist 580 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 580 is resynthesized one or more times depending on design specifications and parameters for the circuit.

Design process 510 may include using a variety of inputs; for example, inputs from library elements 530 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 585 (which may include test patterns and other testing information). Design process 510 may further include, for example, standard circuit design processes such as timing analysis, verification, design rule checking, place and route operations, etc. One of ordinary skill in the art of integrated circuit design can appreciate the extent of possible electronic design automation tools and applications used in design process 510 without deviating from the scope and spirit of the invention. The design structure of the invention is not limited to any specific design flow.

Design process 510 preferably translates an embodiment of the invention as shown in [fill in figure or figures that represent the design], along with any additional integrated circuit design or data (if applicable), into a second design structure 590. Design structure 590 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 590 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in [fill in figure or figures that represent the design]. Design structure 590 may then proceed to a stage 595 where, for example, design structure 590: proceeds to tape-out, is released to manufacturing, is released to a mask house, is sent to another design house, is sent back to the customer, etc.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A design structure embodied in a machine readable medium, the design structure comprising:

a. a plurality of parts of a digital computational system, at least a first subset of the plurality of parts having a part functionality sufficient to execute a computational job and at least a second subset of the plurality of parts having a part functionality that is not sufficient to execute the computational job;

b. a parts information storage that stores an indication of power consumption and part functionality by each of the plurality of parts within the single computational system; and c. a parts assembler that, when the job is sent to the computational system, determines which combinations of the plurality of parts have functionality sufficient to execute the computational job and that allocates a set of the plurality of parts with sufficient functionality to execute the computational job to the computational job based on an indication of power consumption by each part stored in the parts information storage so that the set of the plurality of parts allocated to the computational job has the lowest power consumption of all possible sets of available parts with functionality sufficient to execute the computational job.

2. The design structure of claim 1, wherein the design structure comprises a netlist.

3. The design structure of claim 1, wherein the design structure resides on storage medium as a data format used for the exchange of layout data of integrated circuits.

4. The design structure of claim 1, further comprising a results feedback mechanism that measures power consumption of each part during use and that updates the part information storage with a revised indication of power usage by a part.

5. The design structure of claim 1, further comprising a bench testing mechanism that benchmark tests each of the plurality parts to determine a power consumption associated with each part.

6. The design structure of claim 5, wherein benchmark testing mechanism is configured to test each of the plurality of parts by simulating a plurality of different workload types.

7. The design structure of claim 5, wherein benchmark testing mechanism is configured to test each of the plurality of parts by testing each of the plurality of parts under a plurality of different configuration conditions.

* * * * *